United States Patent [19]

Bailard et al.

[11] Patent Number: 4,957,392
[45] Date of Patent: Sep. 18, 1990

[54] METHOD AND APPARATUS FOR THE ACTIVE PREVENTION OF SEDIMENTATION IN HARBORS AND WATERWAYS

[76] Inventors: James A. Bailard, 1150 Bailard Ave., Carpinteria, Calif. 93013; Scott A. Jenkins, 14765 Kalapana St., Poway, Calif. 92064

[21] Appl. No.: 344,079

[22] Filed: Apr. 27, 1989

[51] Int. Cl.⁵ .......................... E02F 3/88; E02B 3/04; E02B 5/28
[52] U.S. Cl. .......................... 405/73; 405/22; 405/74; 37/75; 37/78; 114/55
[58] Field of Search .................. 405/21, 22, 52, 62, 405/73, 74, 79, 80; 37/75, 77, 78, 79; 114/55

[56] References Cited

U.S. PATENT DOCUMENTS

| | | | |
|---|---|---|---|
| 3,109,288 | 11/1963 | Gross | 405/61 |
| 3,449,915 | 6/1969 | Cummings | 405/74 |
| 3,683,627 | 8/1972 | Girden | 405/52 |
| 3,964,184 | 6/1976 | Mathieu | 37/78 X |
| 4,073,078 | 2/1978 | Leitz | 37/77 |
| 4,439,060 | 3/1984 | Liscio | 405/52 X |
| 4,548,525 | 10/1985 | Priebe | 405/52 |
| 4,819,347 | 4/1989 | Lofgren | 37/78 |

FOREIGN PATENT DOCUMENTS

| | | | |
|---|---|---|---|
| 809175 | 7/1951 | Fed. Rep. of Germany | 37/77 |
| 446073 | 3/1949 | Italy | 37/78 |
| 412356 | 7/1974 | U.S.S.R. | 37/78 |

Primary Examiner—Randolph A. Reese
Assistant Examiner—John A. Ricci
Attorney, Agent, or Firm—James E. Brunton

[57] ABSTRACT

An apparatus for preventing sedimentation buildup in waterways having a current, the apparatus being submergible at a location proximate the edge of the waterway and adapted to produce a scour pattern of predetermined configuration. The apparatus includes an elongated, substantially vertical tubular member having an inlet assembly connected proximate the upper end of the tubular member; a turbine fan unit mounted interiorly of the inlet assembly for controllably drawing water into the apparatus; and a discharge assembly connected to the tubular member proximate its lower end for directing the flow of water outwardly from the tubular member in generally horizontal direction at an optimum flow rate.

3 Claims, 4 Drawing Sheets

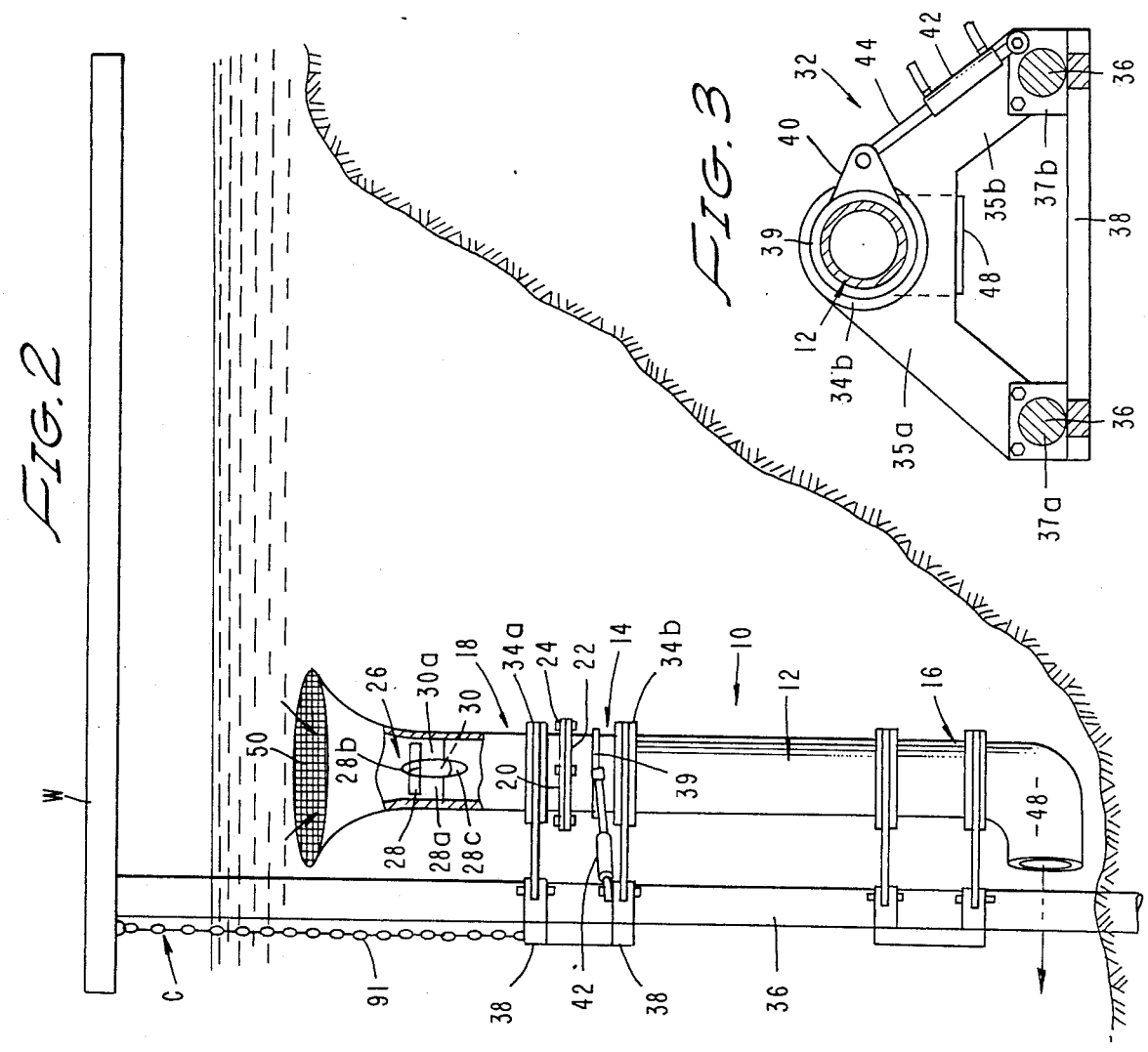

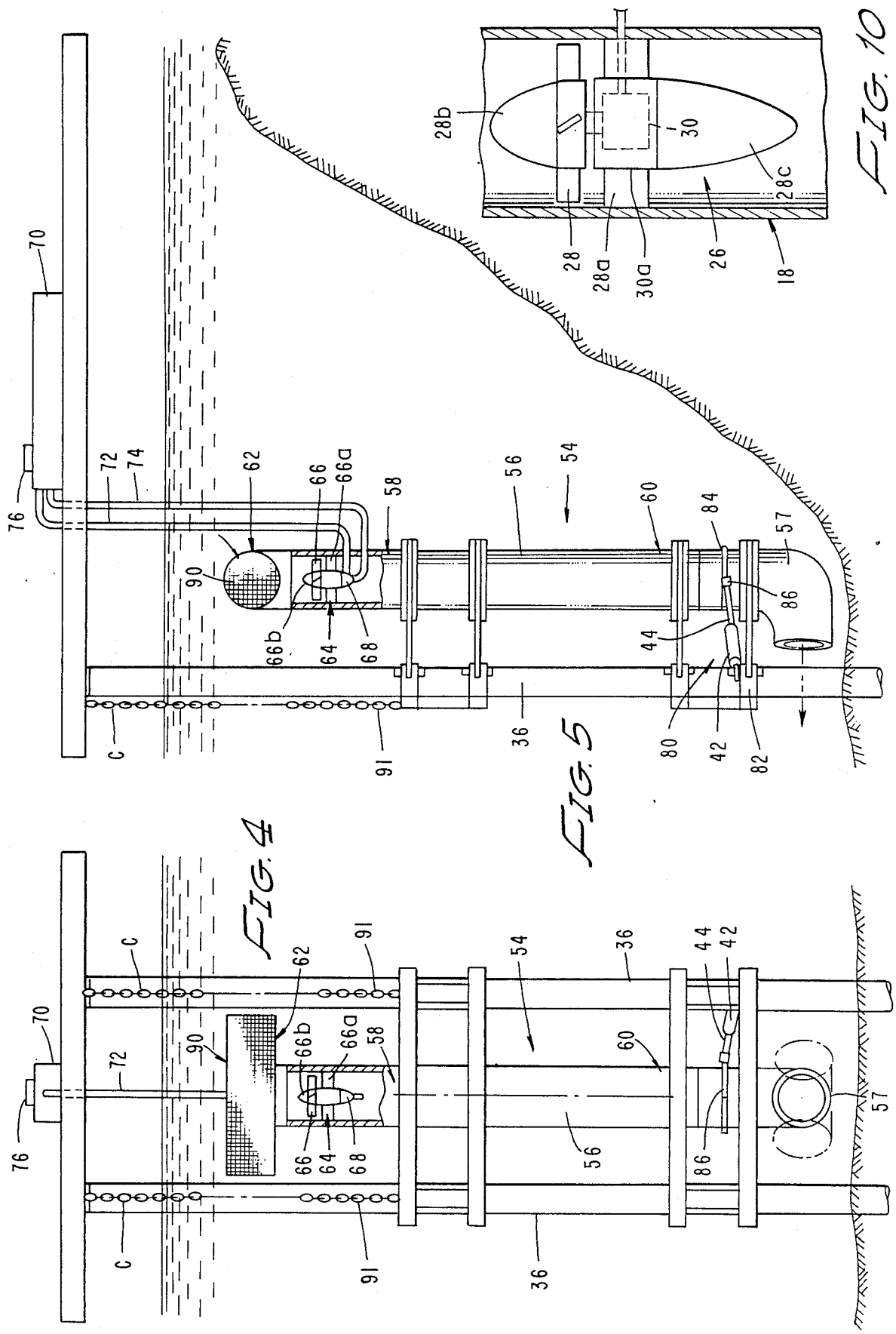

METHOD AND APPARATUS FOR THE ACTIVE PREVENTION OF SEDIMENTATION IN HARBORS AND WATERWAYS

BACKGROUND OF THE INVENTION

1. Field of the Invention

The present invention relates generally to a method and apparatus for maintaining sufficient water depth in harbors and waterways to accommodate deep draft vessels. More particularly, the invention concerns a method and apparatus for accomplishing daily resuspension of newly deposited sediments using a submerged, turbulent water discharge, thereby eliminating the need for periodic dredging and its associated adverse environmental impacts.

2. Discussion of the Invention

Introduction - Most present day harbors are located in bays and estuaries which formed at the mouths of major rivers. These harbors have natural water depths of about 20 feet. At this depth, ebbing water currents are sufficiently intense to carry sediments, introduced by the rivers and streams, through the harbor and out to the ocean.

Although 20 foot water depths were adequate for early sailing vessels, the introduction of deeper draft vessels around the turn of the century created the need for greater water depths. Bucket and suction dredges were introduced to deepen the navigation channels and berthing areas. With these increased depths came the need for continual maintenance dredging. This process of progressive deepening and subsequent maintenance dredging continues to this day. For example, today's major ports and harbors have water depths of 40 feet or more, reflecting the massive size of modern deep draft tankers and bulk carriers.

Increasing the depth of channels and berthing areas reduces the scouring action of natural water currents. As a result, these quiet water areas have become natural collection points for sediments which in the past would be transported through the area and out to sea. Furthermore, the deeper one dredges these areas, the faster they fill in. As a result, maintenance dredging has become an increasingly burdensome problem.

After 150 years of dredging, dredged material disposal areas are becoming scarce. The problem has been compounded by recent environmental regulations which severely limit available options for dredged material disposal. These regulations came about through the recognition that harbor silts and clays have a proclivity for absorbing heavy metals and other toxins. As a result, the cost of dredging has risen sharply in recent years.

Conventional dredging techniques focus on the efficient removal of consolidated bottom sediments. Conventional dredges achieve their economies of scale by removing large volumes of sediment relatively infrequently. As a result, harbor channels and berthing areas are typically dredged every year or two. In between dredgings, sedimentation continues to occur, so that towards the end of a dredging cycle, ship operators are forced to carry only a partial load to avoid grounding.

The shortcomings associated with conventional dredging methods have led to the search for alternative methods of maintaining adequate water depths. One approach has been to interrupt the sedimentation process, either by preventing the influx of sediment to, or the deposition of sediment within a harbor or waterway area. This approach, termed sedimentation control, has proven most effective in harbor berthing areas. An important benefit of the sedimentation control approach is that the costly dredge material disposal problem is avoided.

Another prior art sedimentation control method involves the use of the scour jet array. This system typically consists of a series of near-bottom water jets positioned along the face of a wharf or dock. The jet array is powered by a high pressure water pump, which discharges to a common manifold pipe. The jets are connected to the manifold pipe by a series of valves and hoses.

Although scour jet array systems are generally effective in preventing unwanted sedimentation, they are quite expensive to build and operate. Tests have shown that the most efficient method of producing a water jet with a sizable range of scour is to use a high flow rate, low velocity discharge. High flow rates, however, require large pumps and pipes, thereby increasing the cost of the scour jet array system.

An alternative method of generating a high flow rate, low velocity discharge is to use a motor driven propeller. A number of agitation dredging and sedimentation control systems have been built using open mounted, near-bottom propellers to produce the required scour flow. One type of prior art propeller system is described in U.S. Pat. No. 3,449,915, issued to T. E. Cummings.

The prior art propeller type systems typically suffer from several fundamental problems: (1) the open propeller design is subject to fouling or damage by waterborne debris; (2) the unprotected propeller can be buried by sediment avalanching from adjacent undredged banks; (3) the propeller type systems utilize high salinity (and, therefore, less efficient) bottom water in producing a turbulent scour plume; and, (4) the exposed propeller poses a hazard to divers and marine mammals.

The method and apparatus of the present invention overcomes the drawbacks of prior art systems through the use of an array of turbine chimney scour units of highly novel design. Compared to conventional prior art dredging methods, the turbine chimney scour system of the present invention is less costly and considerably less damaging to environmental water quality. By continually preventing sediment deposition, the turbine chimney scour system avoids the costly problem of dredged material disposal. Additionally, reducing the residence time of the resuspended sediments minimizes the very serious environmental problem of adsorption and release of heavy metals and other toxins. The turbine chimney scour system also minimizes the impact to benthic organisms which are periodically destroyed by conventional dredging methods.

The turbine chimney scour system of the present invention is also considerably more effective and less environmentally damaging than the prior art agitation dredging methods. The prior art agitation dredging methods typically function by remobilizing consolidated bottom sediments, allowing ambient currents to carry them from the area. For example, one common prior art method utilizes a specially-designed vessel to suck sediment off the bottom and discharge it horizontally across the water surface. The objective is to raise the material high enough within the water column so that it is carried a significant distance downstream by ebbing currents. Agitation dredging is typically performed only once or twice a year. The lengthy period of time between dredging is critical, for it allows the sediments to consolidate, greatly increasing their shear strength and resistance to resuspension. As a result, agitation dredging methods are not particularly effective, since they fail to fully resuspend the consolidated bottom sediments, causing them to deposit a short distance downcurrent.

In contrast to agitation dredging, the apparatus of the present invention is typically activated on a daily basis, fully resuspending the thin layer of newly deposited sediment. This provides three important benefits: (1) water turbidity is less because less sediment is resuspended during each operation; (2) transport distances are greater because the sediment is fully resuspended; and, (3) fewer toxins are released because the bottom sediments have a negligible residence time before being resuspended.

Compared with the pump based prior art scour jet array systems, the turbine chimney scour system of the present invention is less costly and considerably more efficient. Cost savings accrue primarily through the use of individual turbine fan units to produce the required jet discharge. This eliminates the need for a long and costly large diameter piping system. Moreover, by utilizing a high flow rate/low velocity discharge, the turbine chimney scour system requires about 1/10th the input power to achieve the same scour performance.

The turbine chimney scour system of the present invention is readily distinguishable from and clearly superior to the prior art open propeller scouring system for several reasons. In the first place, the turbine fan is a different and intrinsically more efficient propulsion method than an exposed propeller. The ducting around the turbine fan acts to produce a higher discharge velocity per unit power input. Enclosing the propulsion device, also, protects divers and unsuspecting marine mammals from accidental injury.

Secondly, the ability to readily adjust the intake location of the apparatus allows low salinity, oxygen rich surface water to be used for scouring. Tests have shown that low salinity water reduces the cohesive strength of the bottom sediments and is more effective in resuspending fine bottom sediments. Additionally, the higher oxygen content of the ingested surface water provides improved water quality near the bottom, which tends to be anaerobic with consequently high bacterial levels. The combination chimney/elbow configuration of the apparatus, also, provides excellent protection of the turbine fan unit from sediment avalanching of adjacent mud banks. Field tests of propeller based scour jet array systems have shown this to be a serious problem.

Another advantage of the apparatus of the invention resides in the novel design of the screened intake which helps to prevent damage to the propulsion unit from waterborne debris. The design, also, prevents the ingestion of fish during operation. The latter is an important permitting consideration in areas having significant marine fisheries (e.g. the salmon fishery in the Pacific Northwest). As an added feature, the flow from the turbine fan can be briefly reversed following operation, helping to clean the screen of any accumulated debris. Still another advantage of the apparatus of the invention is the gravity support frame which permits rapid installation and recovery of the turbine chimney scour units for routine maintenance.

SUMMARY OF THE INVENTION

It is an object of the present invention to provide an efficient, cost effective and environmentally acceptable method and apparatus for preventing sediment build-up in harbor and waterway areas.

Another object of the invention is to provide a method and apparatus for reducing adverse environmental impacts associated with conventional prior art methods, including release of sediment borne toxins into the water column release of excessive sediment turbidity and the periodic killing of benthic organisms.

Another object of the invention is to provide a method and apparatus for preventing sediment deposition which uniquely uses a safe and efficient horizontal directed, turbulent, nearbottom water discharge typically operated on a daily basis.

Still another object of the invention is to provide a safe and easy to use method and apparatus for preventing sediment deposition in harbors and waterways without interfering with ship navigation.

Another object of the present invention is to provide a method and apparatus for significantly reducing the cost of maintaining adequate water depths in harbors and waterways.

Still another object of the present invention is to provide a method and apparatus which effectively eliminates the need for periodically dredging harbor and waterway areas and disposing of the dredged material.

A further object of the invention is to provide a method and apparatus in which low salinity water can be used for scouring.

BRIEF DESCRIPTION OF THE DRAWINGS

FIG. 1 is a front view of one form of the apparatus of the invention.

FIG. 2 is a side elevational view of the apparatus.

FIG. 3 is a cross-sectional view taken along lines 3—3 of FIG. 1.

FIG. 4 is a front view of an alternate form of apparatus of the present invention.

FIG. 5 is a side view of the apparatus shown in FIG. 4.

FIG. 10 is an enlarged schematic view of the turbine assembly of the apparatus.

DESCRIPTION OF THE INVENTION

Figure 6:
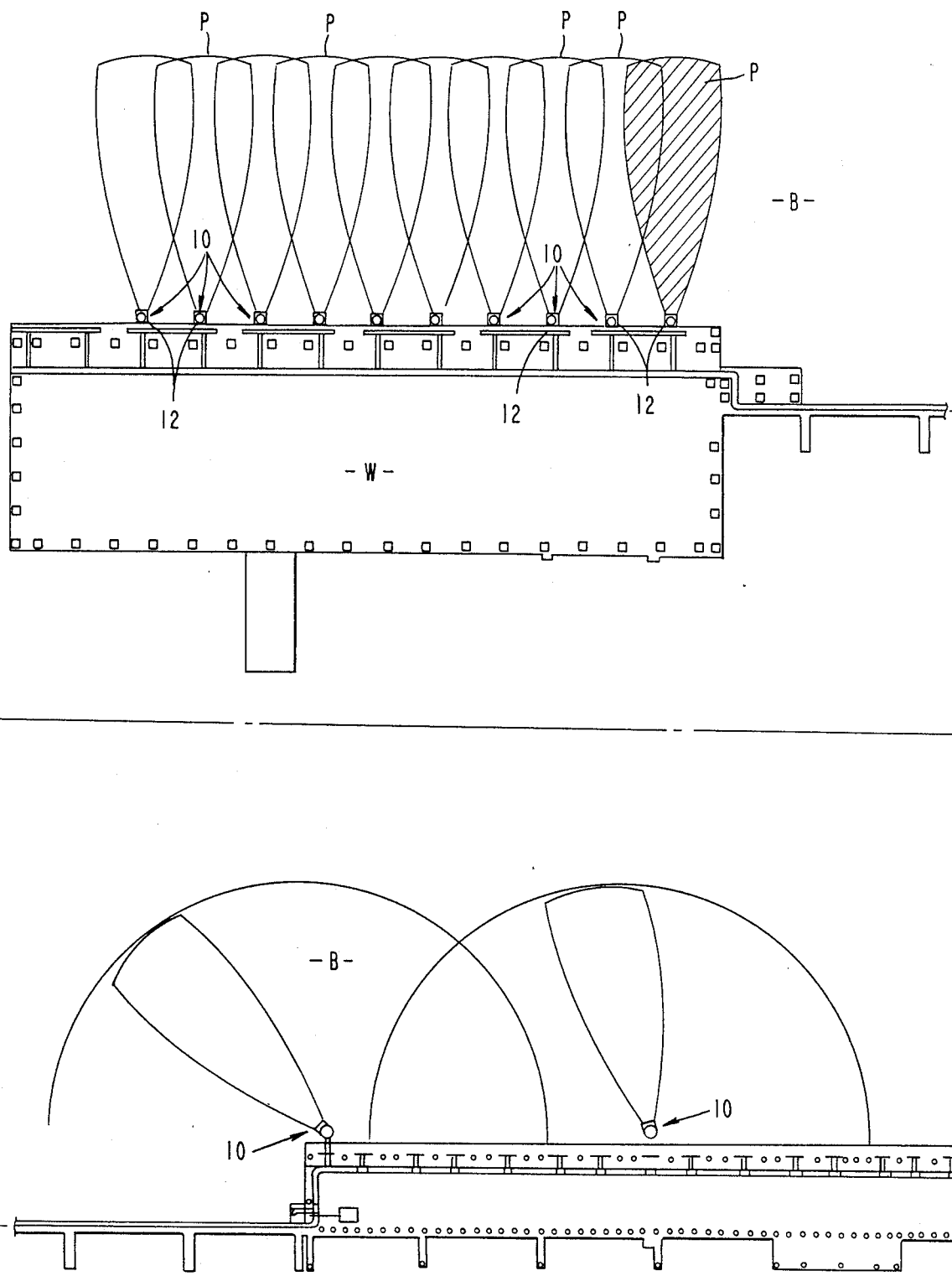
FIG. 6 is a generally diagrammatic view illustrating alternate scour patterns obtainable through the use of the apparatus of the present invention.

Referring to the drawings and particularly to FIGS. 1, 2 and 3, one form of the apparatus of the present invention is there illustrated. Here, the apparatus is shown being used for preventing sedimentation build-up in a harbor berthing area of the character having a wharf W fronting a berthing area B. In this embodiment of the invention, the apparatus comprises a plurality of scour units 10 and connected to the wharf W in a side-by-side relationship (FIG. 6).

Each scour unit 10 comprises a vertical tubular member 12 having a vertical axis, a upper end 14 and a lower end 16. Connected proximate the upper end of each tubular member 12 is an inlet means for directing the flow of water from a location near the surface of the water of the berthing area into tubular member 12. This inlet means is provided in the form of a bell-mouth shaped, inlet assembly 18. As best seen in FIGS. 1 and 2, assembly 18 is connected with tubular member 12 by means of mating flanges 20 and 22 provided respectively on members 18 and 12. Flanges 20 and 22 are interconnected together by suitable fasteners, such as bolts 24. With this arrangement inlet members of various heights can be readily interconnected with the tubular members 12 so as to position the upper end of the bell-shaped inlet assembly 18 at an optimum location below the surface of the water in the particular berthing area being scoured.

Mounted interiorly of each inlet member 18 is means for controllably drawing water from the near surface of the berthing area into the inlet means. As best seen in FIG. 10, in the present embodiment of the invention, this means is provided as a turbine assembly 26, which includes impeller blades 28, stator blades 28a, a nose fairing 28b, and a tail fairing 28c. Stator blades 28a are attached to the inlet member or chimney (FIG. 10). The impeller blades, or fan, are controllably rotated by a motor means, such as a submersible electric motor 30 mounted inside motor housing 30a. Electric or hydraulic motors, suitable for use in the present application, are well-known to those skilled in the art and are readily commercially available. However the fan stator blades and fairing are custom designed for the defined use.

Connected proximate the lower end of each tubular member 12 is a discharge means, shown here as an elbow shaped member 48, for directing the flow of water outwardly therefrom in a generally horizontal direction to produce a near bottom scour pattern of a predetermined configuration. As best seen in FIG. 6, the scour units 10 are strategically positioned along the wharf W so that the scour patterns P produced by the discharge means overlap one another in an optimized manner.

Referring particularly to FIG. 3, actuating means, generally designated by the numeral 32, are operably connected to each tubular member 12 to affect a desired degree of rotation of tubular member as, for example, selectively through angles of 90 or 180 degrees. As best seen by referring to FIGS. 2 and 3, each of the tubular members 12 is rotatably mounted within vertically spaced apart collar assemblies 34a and 34b. These collar assemblies are, in turn, fixedly interconnected to adjacent wharf pilings 36 by brackets 37a and 37b in the manner shown in FIG. 1.

Collar assemblies 34a and 34b are of identical construction each including angularly inwardly extending arms 35a and 35b which are connected to brackets 37a and 37b. Collar assemblies 34a and 34b also include transverse members 38 which engage the adjacent pilings 36 to counteract the forces generated by the discharge of water through elbows 48. A ring 39 having an ear 40 is connected to each tubular member 12 intermediate collars 34. Disposed intermediate ear 40 and a mounting bracket 37b which interconnects the lower collar assembly 34b with the piling 36 is a hydraulically actuated means for urging rotational movement of ring 39 and in turn tubular member 12.

In the present embodiment of the invention, the hydraulically actuated means comprises a hydraulic cylinder 42 within which a connector arm and piston assembly 44 is carried. Hydraulic cylinder 42 is pivotally interconnected with mounting bracket 37b and connector arm 44 is pivotally interconnected with ear 40 in the manner shown in FIG. 3. Reciprocal movement of the piston interiorly of cylinder 42 urges telescopic movement of connector arm 44 inwardly and outwardly of the cylinder 42, which, in turn imparts rotational movement to ring 39 and to tubular member 12 to which it is connected. With this construction, as tubular member 12 is rotated, the discharge means, shown here as an elbow 48, which is interconnected to tubular member 12 proximate its lower end 16, is also rotated through a predetermined angle. As the tubular member 12 and discharge elbow 48 are rotated by the actuating means, a scour pattern of the character illustrated in the lower part of FIG. 6, is achieved. In the drawings, this scour pattern is shown as semicircular in shape. However, the scour pattern may be of any angle desired for the optimum displacement of sedimentation within any particular berthing area or waterway.

An important aspect of the apparatus of the present invention, is means for preventing ingestion into the scour units of fish, debris and other articles larger than a predetermined size. In the embodiment of the invention shown in FIGS. 1 and 2, this means is provided in the form of a mesh screen 50 which covers the open end of the bell-mouthed shaped inlet 18.

Referring particularly to the upper portion of FIG. 6, the scour units 10 are arranged along the face of the wharf in the manner shown to provide near uniform scour coverage throughout the protected area. Spacing between the assemblies is governed by the lateral dimensions of the individual scour patterns. In the form of the apparatus shown in the drawings, the discharge means are strategically configured to produce fixed scour patterns of a generally tear-dropped configuration having a length to width ratio of about 3. To minimize zones of incomplete scour, the assemblies are arranged so as to produce approximately 20 percent overlap between adjacent scour patterns. As indicated in the lower portion of FIG. 6, rotating the discharge means in the manner previously discussed, produces arcuate shaped scour patterns which span up to 180 degree sectors depending on whether the jets are operated only during ebb and flow conditions or during both ebb and flood flow conditions.

Turning now to FIGS. 4 and 5, another form of the apparatus of the present invention is there illustrated. The apparatus of this form of the invention is similar in many respects to the earlier described apparatus and like numbers are used to identify like components. Each scour unit 54 of this embodiment of the invention comprises a vertical tubular member 56 having a vertical axis, an upper end 58 and a lower end 60. Connected proximate the upper end of each tubular member 56 is an inlet means for directing the flow of water from a location near the surface of the water of the berthing area into tubular member 56. This inlet means is provided in the form of a generally "T"shaped, inlet assembly 62 integrally formed with tubular member 56.

Mounted interiorly of each tubular member 56 is means for controllably drawing water from the near surface of the berthing area into the inlet means. In this second embodiment of the invention, this means is provided as a turbine assembly 64, which includes a fan 66, a stator 66a and a fairing 66b. The fan is controllably rotated by a pneumatic motor means, such as a submersible hydraulic motor 68. Hydraulic motor 68 is connected to a central, deck-mounted hydraulic power unit 70, via a pair of supply hoses 72 and 74 (FIG. 5). Power unit 70 feeds a supply manifold loop (not shown) with branch lines to each scour unit. Flow to each branch line is controlled by a control device 76 operably associated with power unit 70. Power units and manifolding and control devices of the character described are well-known to those skilled in the art and are readily commercially available.

Rotatably connected proximate the lower end of each tubular member 56 is a discharge means, shown here as an elbow shaped member 57, for directing the flow of water outwardly therefrom in a generally horizontal direction to produce a near bottom scour pattern of a predetermined configuration. As was the case with the earlier described embodiment, the scour units 54 are strategically positioned along the wharf W so that the scour patterns P produced by the discharge means overlap one another in an optimized manner. In this second form of the invention, the tubular members 56 are fixedly mounted and only the discharge means is rotatable to produce the scour patterns shown in the lower portion of FIG. 6.

Referring particularly to FIG. 5, actuating means, generally designated by the numeral 80, are operably connected to each discharge elbow 57 to affect a desired degree of rotation of the elbow, for example, selectively through angles of 90 or 180 degrees. The actuating means 80 is of similar construction to that previously described and shown in FIG. 3. More particularly, means 80 comprises a hydraulic cylinder 42 within which a connector arm and piston assembly 44 is carried. Hydraulic cylinder 42 is pivotally interconnected with mounting bracket 82 (FIG. 5) and connector arm 44 is pivotally interconnected with a ring 84 having ear 86. In the present instance, however, ring 84 is connected to discharge elbow 57 which, in turn, is rotatably mounted to tubular member 56 proximate its lower end 60. Reciprocal movement of the piston interiorly of cylinder 42 urges telescopic movement of connector arm 44 inwardly and outwardly of the cylinder 42, which, in turn imparts rotational movement to ring 84 and to elbow 57 to which it is connected. With this construction, as elbow 57 is rotated by the actuation means, a scour pattern of the character illustrated in the lower part of FIG. 6, is achieved. As before, while the scour pattern is shown as semicircular in shape, the scour pattern may be of any angle desired for the optimum displacement of sedimentation within any particular berthing area or waterway.

The apparatus of the second form of the invention, also, includes means for preventing ingestion into the scour units of fish, debris and other articles larger than a predetermined size. This means is here provided in the form of a cylindrically shaped, closed end mesh screen 90 which forms a part of the "T" shaped inlet 62. The "T" shaped screen provides an increased surface area which reduces screen intake velocities sometimes.

Referring particularly to the upper portion of FIG. 6, the scour units 54 are arranged along the face of the wharf in the manner previously described to provide near uniform scour coverage of the character shown throughout the protected area.

In the embodiment of the invention shown in FIGS. 1 through 3, as well as that shown in FIGS. 4 and 5, the support frame is designed to span two adjacent pilings 36. Chains C (91) which are connected to the wharf, help to support the weight of the scour units and to hold them in place relative to the pilings. The frame allows the thrust from the jet discharge to be carried back against the face of the pilings. The use of simple chain hoist and flexible supply hoses 72 and 74 allows an entire scour unit to be raised out of the water for servicing. Hoist arrangements of this character are well known to those skilled in the art and the details thereof will not be described herein.

Figures 7, 8:
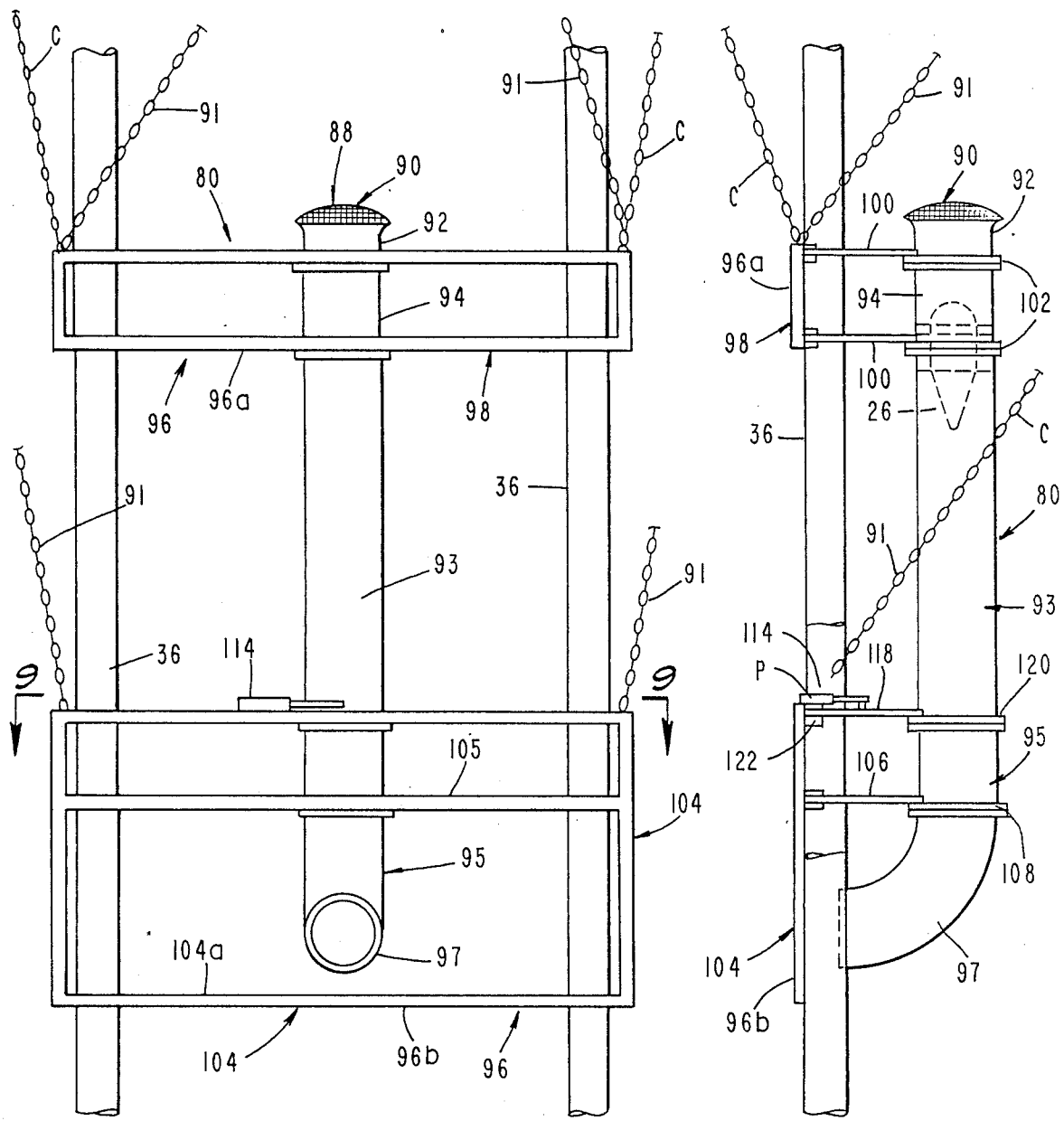
FIG. 7 is a front view of another alternate form of the apparatus of the invention comprising a gravity support frame which rests against, but is not attached to the pier pilings.
FIG. 8 is a side view of the apparatus shown in FIG. 7.
Figure 9:
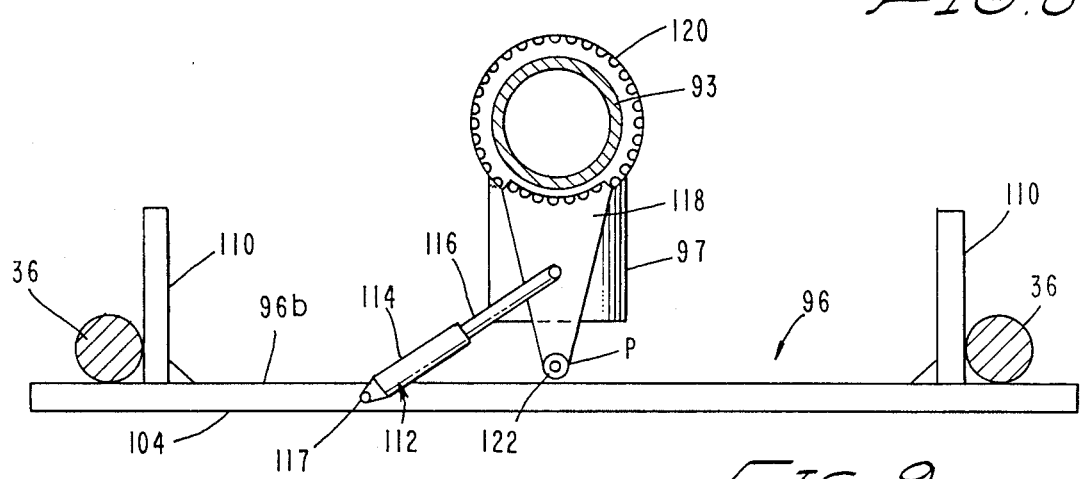
FIG. 9 is a cross-sectional view taken along lines 9—9 of FIG. 7.

Referring to FIGS. 7 through 9, still another form of the apparatus of the invention is shown. In this form of the invention, an alternative support method is illustrated.

The apparatus of this third form of the invention is similar in many respects to the earlier described apparatus and like numbers are used to identify like components. Each scour unit 80 of this embodiment of the invention comprises a vertical tubular member 93 having a vertical axis, an upper end 94 and a lower end 95. Connected proximate the upper end of each tubular member 93 is an inlet means for directing the flow of water from a location near the surface of the water of the berthing area into tubular member 93. This inlet means is provided in the form of an inlet assembly integrally formed with tubular member 93 and having a convex shaped inlet screen 90 covering the inlet port 92.

Mounted interiorly of each tubular member 93 is means for controllably drawing water from the near surface of the berthing area into the inlet means (FIG. 8). In this embodiment of the invention, this means is provided as a turbine assembly 26, of the character shown in FIG. 1.

Connected proximate the lower end of each tubular member 93 is a discharge means, shown here as an elbow shaped member 97, for directing the flow of water outwardly therefrom in a generally horizontal direction to produce a near bottom scour pattern of a predetermined configuration. As was the case with the earlier described embodiment, the scour units 80 are strategically positioned along the wharf W so that the scour patterns P produced by the discharge means overlap one another in an optimized manner.

An important aspect of the form of the invention shown in FIGS. 7 through 9, is the design of the support frame 96 which comprises upper and lower assemblies 96a and 96b. Importantly, frame 96, which is connected to and supports tubular member 93, rests against, but is not connected to the pier pilings 36.

Upper frame assembly 96a comprises a generally rectangularly shaped face member 98 which is connected to upper and lower braces 100 (FIG. 8), which are, in turn, connected to support rings 102 mounted on member 93. Lower frame assembly 96b also comprises a generally rectangularly shaped face member 104 having a cross member 105 which is connected to a brace 106, which is, in turn, connected to a support ring 108 mounted on member 93 (FIG. 8).

Turning to FIG. 9, it can be seen that lower frame assembly 96b further includes a pair of horizontally extending arms 110 which engage pilings 36. These arms function to carry the lateral thrust of the discharge means as the scour unit is rotated in a manner presently to be described. Additionally, face member 104 (FIG. 7) is provided with a lower, transversely extending member 104a which is disposed below elbow 97 to eliminate the rotational movement induced by the discharge means.

As best seen by referring to FIGS. 8 and 9, actuating means generally designated by the numeral 112, are operably connected to each tubular member 93 to affect a desired degree of rotation of the support member about a fixed point P on the support frame 96b. The actuating means 112 comprises a hydraulic cylinder 114 within which a connector arm and piston assembly 116 is carried. Hydraulic cylinder 114 is pivotally interconnected with frame 96b at a point 117 and connector arm 116 is pivotally interconnected with a bracket 118. Bracket 118 is, in turn, connected to ring 120 which is connected to tubular member 93 at a location above ring 108. The inboard end of bracket 118 is pivotally connected to frame 96b by a pivot pin 122 located at point P. Reciprocal movement of the piston interiorly of cylinder 114 urges telescopic movement of connector arm 116 inwardly and outwardly of the cylinder 114, which, in turn, imparts pivotal movement to bracket 118 about point P. This results in an arcuate movement of tubular member 93 in the manner illustrated in FIG. 9.

The scouring units 80 of this latter embodiment are typically held in place against pilings 36 by chains C (91) of the same character shown in FIGS. 1 and 2. Similarly, the units are raised and lowered by chain hoists of a character well known to those skilled in the art.

In operating the various embodiments of the invention in accordance with the method of the present invention, the scour units are typically activated twice daily by an automatic control system. The control system is programmed to initiate system operation at the optimum time to ensure maximum sediment flushing by ambient currents. Typically, the individual scour units are sequentially activated, beginning with the furthermost upstream unit. The duty cycle for each scour unit can be adjusted to accommodate differences in sediment scour properties and the arc of scan rotation. In addition, the rate of scan of each scour unit can be adjusted. Tests have shown that highly cohesive sediments require longer duty cycle times and slower scan rates to ensure proper scouring action. As previously mentioned, by adjusting the location of the intake means, low salinity water can be used for scouring.

The scouring action of the turbine fan discharge serves to resuspend the thin layer of sediment newly deposited during the previous flood tide. The frequent operation of the scour system reduces input power requirements and minimizes the turbidity produced by the discharge plume. In addition, the short residence time of the newly deposited sediments minimizes adsorption of undesirable toxins. Both features serve to minimize potential adverse environmental impacts to water quality.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. An apparatus for preventing sedimentation buildup in harbor berthing area of the character having wharf fronting the berthing area, comprising a plurality of submergerd, scour units disposed adjacent said wharf in side-by-side relationship, each said scour unit comprising:
    (a) a vertical tubular member having a vertical axis including an upper end and a lower end;
    (b) inlet means connected proximate said upper end of said tubular member for directing the flow of water into said tubular member;
    (c) turbine means mounted interiorly of said inlet means for controllably drawing water into said inlet means, said turbine means including a rotating fan and hydraulic motor means for controllably rotating said fan;
    (d) discharge means connected proximate the lower end of said tubular member for directing the flow of water outwardly therefrom in a generally horizontal direction to produce a near bottom, scour pattern of a predetermined configuration, said scour units being arranged along said wharf so that said scour patterns produced by said discharge means overlap one another;
    (e) means for rotating each said discharge means about the vertical axis of each said tubular member, whereby each said discharge means produces a scour pattern spanning about 180 degrees;
    (f) operating means mounted on said wharf and operably interconnected with each said hydraulic motor means for providing hydraulic fluid for operating each said hydraulic motor means; and
    (g) means mounted on said wharf for raising and lowering each said tubular member.

2. An apparatus for preventing sedimentation buildup in a harbor berthing area of the character having a wharf fronting the berthing area, comprising:
    (a) a vertical tubular member having a vertical axis including an upper end disposed below the surface of the berthing area and a lower end;
    (b) inlet means connected proximate said upper end of said tubular member for directing the flow of subsurface water into said tubular member;
    (c) turbine means mounted interiorly of said inlet means for controllably drawing water into said inlet means;
    (d) discharge means connected by means of a single 45 degree to 135 degree turning elbow proximate the lower end of said tubular member for directing the flow of water outwardly therefrom in a generally, horizontal direction to produce a near bottom scour pattern of a predetermined configuration;
    (e) fully submerged means for rotating said discharge means about the vertical axis of said tubular member; and
    (f) means mounted on said wharf for raising and lowering said tubular member.

3. An apparatus as defined in claim 2 further including operating means mounted on said wharf for controllably operating said turbine means.

* * * * *